3,353,904
CROSS-LINKING CELLULOSE AND STARCH WITH PERFLUOROPOLYENES HAVING AT LEAST TWO UNSATURATED TERMINAL GROUPS
Robert D. Englert, Sierra Madre, Ronald Swidler, Pasadena, Lester P. Berriman, Arcadia, and Robert H. Wade, Altadena, Calif., assignors, by mesne assignments, to Koratron Company, Inc., a corporation of California
No Drawing. Filed Feb. 15, 1965, Ser. No. 432,863
17 Claims. (Cl. 8—120)

The present invention is directed to a process for treating cellulosic and other naturally occurring organic materials such as starch which have accessible hydroxyl groups with perfluoropolyenes and the products produced thereby. The present invention is particularly useful for the treatment of cellulosic materials such as cotton to provide a variety of highly desirable properties including water resistance, soil resistance and wrinkle recovery to such materials.

Although a substantial amount of research and development work has been devoted to the chemical modification of cellulosic materials in recent years, many commercially available cellulosic fabrics which have been chemically treated do not possess permanent water resistance and/or permanent soil resistance. Rather, as is well known to the consumers of these articles, the water repellency of many raincoats and the like comprising treated cellulosic fibers and the soil resistance of many fabrics comprising treated cellulosic fibers is substantially destroyed by laundering and other cleaning methods with the result that subsequent treatment is necessary to restore water and/or soil resistance. The present invention provides an extremely effective method for permanently imparting water resistance and wrinkle recovery to cellulosic and similar materials.

It is an object of the present invention to provide a process for imparting permanent water resistance and wrinkle recovery to cellulosic materials and the like.

It is another object of the present invention to provide a process for crosslinking cellulosic materials and the like with perfluoropolyenes having at least two unsaturated terminal groups in the presence of a basic catalyst.

Other objects and advantages of the present invention, it is believed, will be apparent from the following detailed description of specific embodiments thereof.

Briefly, the present invention comprises the treatment of naturally occurring organic materials having accessible hydroxyl groups, e.g., cotton, regenerated cellulose, starch, etc., with perfluoropolyene compositions containing at least two unsaturated terminal groups in the presence of a basic catalyst. Thus, the perfluoro compositions which may be used in the present invention have the formula:

$$CF_2=CF-R-CF=CF_2 \qquad (1)$$

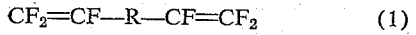

wherein R may be $(CF_2)_n$ or may be branched chain perfluoro radical the terminal groups of which may or may not be unsaturated. The value of $n$ in $(CF_2)_n$ is limited only by the extent to which long chains will prevent penetration of the perfluoro compound into the interior of the cellulosic or other molecules and thereby prevent effective crosslinking and may be from 0–9 or greater. However, since such penetration may be aided by swelling the cellulosic or other material or by appropriate solvent exchange systems, and since such penetration will depend on the nature of the cellulosic or other material, the quantitative limit on $n$ will vary in different reaction systems.

The use of perfluorobutadiene (PFB) has been found highly satisfactory in the present invention, but it is to be emphasized that any compounds which meet the foregoing requirements may be used such as 1,3,5-octafluorohexatriene and 2-trifluoromethyl-1,3-butadiene.

Although the present invention is not to be limited to any particular theory of operation, it is believed that the perfluoropolyenes having terminal unsaturation react with the hydroxyl groups in the cellulosic or other materials with which they are reacted to produce ether linkages. Thus, it is believed that the products of these reactions may be considered to be perfluoroalkyl ethers of cellulose and similar materials. It is further believed that the terminal unsaturated groups of the perfluoropolyenes will react with hydroxyl groups on different cellulose molecules to produce crosslinking. The excellent wrinkle recovery properties possessed by the cellulosic products of the present invention are believed to confirm the occurrence of such crosslinking.

Among the many unique features of the present invention is the facility with which cotton may be crosslinked under non-degradative conditions. As is well known to those skilled in the art, many reactions which can be performed with some cellulosic materials cannot be performed, or can be performed only with great difficulty, when cotton is used. Thus, unlike many crosslinking reactions which are successful with other cellulosic materials but not with cotton, the present invention provides a unique method of crosslinking cellulosic materials including cotton.

Another important features of the present invention is that it permits cotton and similar fabrics to be rendered water repellent without substantially decreasing the permeability of such fabrics to water vapor. Thus, a fabric treated according to the present invention will have increased water repellency and will also be able to "breathe" because of its permeability to water vapor.

The reactions of the present invention must be carried out in the presence of a basic catalyst. However, this may be accomplished in several ways. For example, the perfluoropolyene may simply be admixed in an aqueous solution of a base such as sodium hydroxide or potassium hydroxide. Alternatively, the cotton or similar material may first be treated with a base and then fumigated with polyene vapor. It has been found that, in general, when the fumigation method is used, less perfluoropolyene is required to produce apparently equivalent changes in the characteristics of the material treated than when treatment in aqueous solution is employed.

The present invention is further illustrated by the following examples in which all proportions are expressed in parts or percent by weight.

*Example I*

A piece of cotton cloth was shaken vigorously in a sealed tube for four days in 25 ml. of an aqueous solution containing 10% potassium hydroxide and 10 gms. of perfluorobutadiene. This material was then tested for water resistance according to ASTM test D583–58 and for wrinkle recovery according to ASTM test D1295–60T. In the former test, 100% water repellency is maximum and in the latter test wrinkle recovery is measured in degrees with 360° being the maximum attainable.

The water repellency of the fabric treated according to this example was found to be 50%, the dry wrinkle recovery was found to be 225° and the wet wrinkle recovery after soaking in water containing a wetting agent was found to be 309° after 2 hours and 271° after 2 days.

These test results compared very favorably with a control sample which was not treated with perfluorobutadiene and which was found to have a water repellency of 0% and a dry wrinkle recovery of 167°–177°. In addition, it was found that the flame resistance of the fabric treated with perfluorobutadiene according to this example as measured by igniting a strip measuring 1.5 by 4 cms. and observing the time taken to complete burning was increased to about 41 seconds, as compared with about 26 seconds for the untreated sample.

The amount of fluorine added to the cotton fabric treated according to this example was found to be less than 1%.

*Example II*

A piece of cotton fabric measuring 8" by 11" was sealed in a thick-walled glass tube together with 35 ml. of an 18% solution of sodium hydroxide and 5 gms. perfluorobutadiene and the tube was shaken vigorously for 96 hours at room temperature. A control was run simultaneously and treated in exactly the same way with the exception of the addition of perfluorobutadiene. The cotton fabric was then removed and rinsed in running water for three hours, ironed dry and hung overnight.

Wrinkle recovery and water repellency were determined in the same manner as in Example I. It was found that the dry wrinkle recovery of the sample treated with perfluorobutadiene according to this example was 136° and the wet wrinkle revovery was 311° as compared with corresponding values of 116° and 160° for the control. The water repellency of the treated sample was 70% as compared with 0% for the control. The tensile strength of the treated sample and the control were also determined and it was found that the strength of the treated sample was 38 lbs. while that of the control was 59.1 lbs.

The fluorine content of the treated sample was found to be about 3.8%.

*Example III*

A piece of cotton measuring 8" by 11" was treated in an aqueous solution containing 5% sodium hydroxide for 30 minutes, squeezed through a wringer and placed in a thick-walled glass tube. 1 gm. of perfluorobutadiene was then added, the tube sealed and then shaken vigorously for 96 hours at room temperature. A control was run simultaneously and treated exactly the same way except for the addition of perfluorobutadiene. The samples were then removed from the tubes, rinsed in running water for 3 hours, dried at room temperature, ironed and hung for 24 hours. The samples were then tested in the same manner as that described in Example I.

The dry wrinkle recovery of the treated sample was found to be 207° and the wet wrinkle recovery was 308° as compared with corresponding values of 161° and 150° for the control. The water repellency of the treated sample was 70% while that of the control was 0%. The tensile strength of the treated sample was 23.2 lbs. and that of the control was 53.0 lbs.

The treated sample was found to have a fluorine content of 2.69%.

*Example IV*

A piece of cotton measuring 8" by 11' was treated in a 5% sodium hydroxide solution for 30 minutes, squeezed through a wringer and placed in a thick-walled glass tube. The glass tube was then connected to a gas manifold and exposed to perfluorobutadiene gas. The reaction was allowed to proceed to apparent completion for about 13 hours. It was found that the dry wrinkle recovery of the sample was 210° and the wet wrinkle recovery was 308°.

When tear strength tests were performed on cotton fabrics treated with perfluorobutadiene according to the present invention, it was found that mercerized fabrics exhibited very little loss in tear strength relative to controls when the add-on of fluorine was relatively low, i.e., less than about 1.5%. In general, as the add-on of fluorine increases, the tear strength of the cloth decreases and the wrinkle recovery improves. Thus, the end use to which the fabric is to be put will play a part in determining the precise type of treatment to which the fabric should be subjected. When it is desired to obtain a balanced maximum of both wrinkle recovery and tear strength, an add-on of fluorine in an amount of about 1% has been found to be desirable. However, it is to be understood that the present invention contemplates add-ons of fluorine in the range of from about 0.5% to about 5% and higher.

When a 5% sodium hydroxide solution is employed as the basic catalyst in the crosslinking reaction, it is generally found that the tear strength of the treated fabric is reduced by about 50% as compared with untreated cotton fabric. Thus, mercerizing solutions, i.e., alkali metal hydroxide solutions having a concentration on the order of about 18%, are most useful in holding tear strength loss to a minimum.

It has also been found that the dry wrinkle recovery of fabrics which have been treated according to the present invention may be increased by heating them. For example, a cotton fabric treated with an 18% solution of sodium hydroxide containing 1 gm. of perfluorobutadiene had a dry wrinkle recovery of 99° which could be increased to 195° by heating at 350° F. for 10 minutes.

The process of the present invention results in some increase in the soil resistance and oil resistance of the fabrics so treated. Such increase may be enhanced by using branched chain perfluoropolyenes wherein the branch comprises a perfluoro radical. For example, such compounds could have the formula:

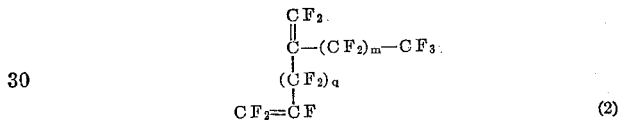

(2)

wherein $m$ and $q$ may be varied over wide limits to produce specific properties.

Alternatively, the process of the present invention could be performed sequentially or simultaneously with treatment with a perfluoromonoolefin such as those, including perfluoroheptene-1, disclosed in applicants' copending application Ser. No. 432,878, filed on the same date as the present application. In such a process, the monoolefin reacts with the hydroxyl groups present on the cellulose or similar molecule to form a monoether which will impart improved water and oil resistance to the resulting compound.

In general, the cotton and similar fabrics which are treated according to the present invention should be treated in such a manner as to produce a fabric having a wet wrinkle recovery of at least about 240° and a water repellency of at least about 50%. In addition, the strength loss resulting from this treatment should not exceed about 50%. It will be readily apparent to those skilled in the art that these properties may easily and conveniently be produced by performing the present invention in several different ways. Thus, the precise treatment used to obtain given properties will be influenced by the equipment available, the cost of the materials which may be used and other similar factors.

Having fully described the present invention, it is to be understood that it is not to be limited to the specific details set forth, but is of the full scope of the appended claims.

We claim:

1. A process comprising reacting a perfluoropolyene having at least two unsaturated terminal groups with a cellulosic material, said reaction being carried out in the presence of a basic catalyst.

2. A process comprising reacting a perfluoropolyene having at least two unsaturated terminal groups with cotton, said reaction being carried out in the presence of a basic catalyst.

3. A process comprising reacting a perfluoropolyene having at least two unsaturated terminal groups with starch, said reaction being carried out in the presence of a basic catalyst.

4. A process comprising reacting a perfluorodiene having unsaturated terminal groups with a cellulosic material, said reaction being carried out in the presence of a basic catalyst.

5. A process comprising reacting a perfluorodiene having unsaturated terminal groups with cotton, said reaction being carried out in the presence of a basic catalyst.

6. A process comprising reacting perfluorobutadiene with a cellulosic material in the presence of a basic catalyst.

7. A process comprising a reacting perfluorobutadiene with cotton in the presence of a basic catalyst.

8. The process of claim 7 wherein said basic catalyst is an alkali metal hydroxide.

9. The process of claim 8 wherein the alkali metal hydroxide is present in an amount sufficient to mercerize said cotton.

10. The process of claim 7 wherein said reaction is allowed to proceed until about 0.5% to about 5% by weight as combined with said cotton.

11. A composition comprising a crosslinked cellulosic material, said material being crosslinked by perfluoroalkyl ether linkages.

12. A crosslinked cotton wherein perfluoroalkyl ether groups are the crosslinking linkages.

13. A crosslinked cotton wherein perfluorobutyl ether groups are the crosslinking linkages.

14. The composition of claim 13 wherein the fluorine in said perfluorobutyl ether groups is present in an amount from about 0.5% to about 5% by weight.

15. A cotton fabric having a wet wrinkle recovery above at least about 240° and a water repellency of at least about 50%, said fabric comprising cotton which has been reacted with a perfluoropolyene having at least 2 unsaturated terminal groups.

16. The fabric of claim 15 wherein said polyene is a perfluorodiene.

17. The fabric of claim 15 wherein said polyene is perfluorobutadiene.

References Cited

Chemical Abstracts, vol. 53, p. 14920e.

NORMAN G. TORCHIN, *Primary Examiner.*

J. C. CANNON, *Assistant Examiner.*